United States Patent
Gao et al.

(10) Patent No.: US 12,456,762 B2
(45) Date of Patent: Oct. 28, 2025

(54) SHUTDOWN SEPARATOR

(71) Applicant: Dow Global Technologies LLC, Midland, MI (US)

(72) Inventors: Peng Gao, Shanghai (CN); David L. Malotky, Midland, MI (US); Yunlong Guo, Shanghai (CN); Daniel L. Dermody, Midland, MI (US); Haiyang Yu, Shanghai (CN); Wanfu Ma, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 500 days.

(21) Appl. No.: 17/997,389

(22) PCT Filed: Apr. 29, 2020

(86) PCT No.: PCT/CN2020/087777
§ 371 (c)(1),
(2) Date: Oct. 28, 2022

(87) PCT Pub. No.: WO2021/217496
PCT Pub. Date: Nov. 4, 2021

(65) Prior Publication Data
US 2023/0170536 A1    Jun. 1, 2023

(51) Int. Cl.
| | |
|---|---|
| *H01M 50/489* | (2021.01) |
| *H01M 10/0525* | (2010.01) |
| *H01M 10/42* | (2006.01) |
| *H01M 50/417* | (2021.01) |
| *H01M 50/443* | (2021.01) |
| *H01M 50/449* | (2021.01) |

(52) U.S. Cl.
CPC ... *H01M 10/4235* (2013.01); *H01M 10/0525* (2013.01); *H01M 50/417* (2021.01); *H01M 50/443* (2021.01); *H01M 50/449* (2021.01); *H01M 50/489* (2021.01)

(58) Field of Classification Search
None
See application file for complete search history.

(56) References Cited

U.S. PATENT DOCUMENTS

| | | |
|---|---|---|
| 6,448,321 B1 | 9/2002 | Tokita |
| 2005/0100794 A1 | 5/2005 | Chamberlain et al. |
| 2007/0243460 A1 | 10/2007 | Carlson et al. |
| 2014/0322587 A1 | 10/2014 | Lai et al. |
| 2015/0325829 A1 | 11/2015 | Lee |
| 2016/0126520 A1 | 5/2016 | Mizuno et al. |
| 2020/0212400 A1 | 7/2020 | Han et al. |

FOREIGN PATENT DOCUMENTS

| | | |
|---|---|---|
| CN | 110323391 A | 10/2019 |
| CN | 110729440 A | 1/2020 |
| EP | 3327822 A1 | 5/2018 |
| JP | H11-86881 A | 3/1999 |
| JP | 2000-208122 A | 7/2000 |
| JP | 2019-192340 A | 10/2019 |
| KR | 20140070199 A | 6/2014 |
| KR | 10-2016-0011531 A | 2/2016 |
| KR | 10-1838659 B1 | 4/2016 |
| KR | 20160065692 A | 6/2016 |
| WO | 2017/061489 A1 | 3/2017 |

OTHER PUBLICATIONS

Machine translation of CN110729440A, published on Jan. 24, 2020 (Year: 2020).*
Machine translation of KR20160011531 A, published on Feb. 1, 2016 (Year: 2016).*

* cited by examiner

*Primary Examiner* — Anca Eoff
(74) *Attorney, Agent, or Firm* — Arthur R. Rogers

(57) ABSTRACT

The present disclosure provides an electrochemical cell. In an embodiment, the electrochemical cell includes a separator disposed between an optional anode and an optional cathode. The separator includes (A) a porous substrate and (B) a porous coating layer on the substrate. The porous substrate (A) is composed of an olefin-based polymer having a melting point, Tm, greater than 130° C. The porous coating layer (B) has a melting temperature from 80° C. to 110° C. The porous coating layer (B) is composed of a plurality of microparticles, and an optional binding agent. The microparticles have an average particle size from 0.3 microns to 1.5 microns. The microparticles are composed of (i) an ethylene-based polymer, having (a) a density from 0.90 g/cc to less than 0.94 g/cc, (b) a Tm from 90° C. to 120° C., (c) a melt index from 30 g/10 min to 600 g/10 min. The microparticles also include (ii) a dispersant composed of a $C_{14}$-$C_{40}$ aliphatic fatty acid. The microparticles also include (iii) an optional acid functional wax.

11 Claims, 2 Drawing Sheets

SHUTDOWN SEPARATOR

BACKGROUND

Thermal runaway and other heat-related safety problems with electrochemical cells, such as lithium-ion batteries and other lithium-based batteries are known. Because of the relatively low initiation temperature and rapid exothermic nature of thermal runaway, a heat-activated shutdown of the lithium battery is needed at a temperature well below the melting point of lithium at 179° C. and the rapid vaporization of the organic electrolyte solvents around this same temperature range.

Demand for lithium-based batteries is growing as lithium-based batteries are becoming more energetic and are increasingly utilized for high power applications such as hybrid electric vehicles (HEVs), for example. Consequently, the art recognizes the need for improved electrode separators capable of rapid shutdown of thermal runaway in an electrochemical cell at a temperature of 135° C. or lower.

SUMMARY

The present disclosure provides an electrochemical cell. In an embodiment, the electrochemical cell includes a separator disposed between an optional anode and an optional cathode. The separator includes (A) a porous substrate and (B) a porous coating layer on the substrate. The porous substrate (A) is composed of an olefin-based polymer having a melting temperature, Tm, greater than 130° C. The porous coating layer (B) has a Tm from 80° C. to 110° C. The porous coating layer (B) is composed of a plurality of microparticles, and an optional binding agent. The microparticles have an average particle size from 0.3 microns to 1.5 microns. The microparticles are composed of (i) an ethylene-based polymer, having (a) a density from 0.90 g/cc to less than 0.94 g/cc, (b) a Tm from 90° C. to 120° C., (c) a melt index from 30 g/10 min to 600 g/10 min. The microparticles also include (ii) a dispersant composed of a $C_{14}$-$C_{40}$ aliphatic fatty acid. The microparticles also include (iii) an optional acid functional wax.

DEFINITIONS

Figure 1:
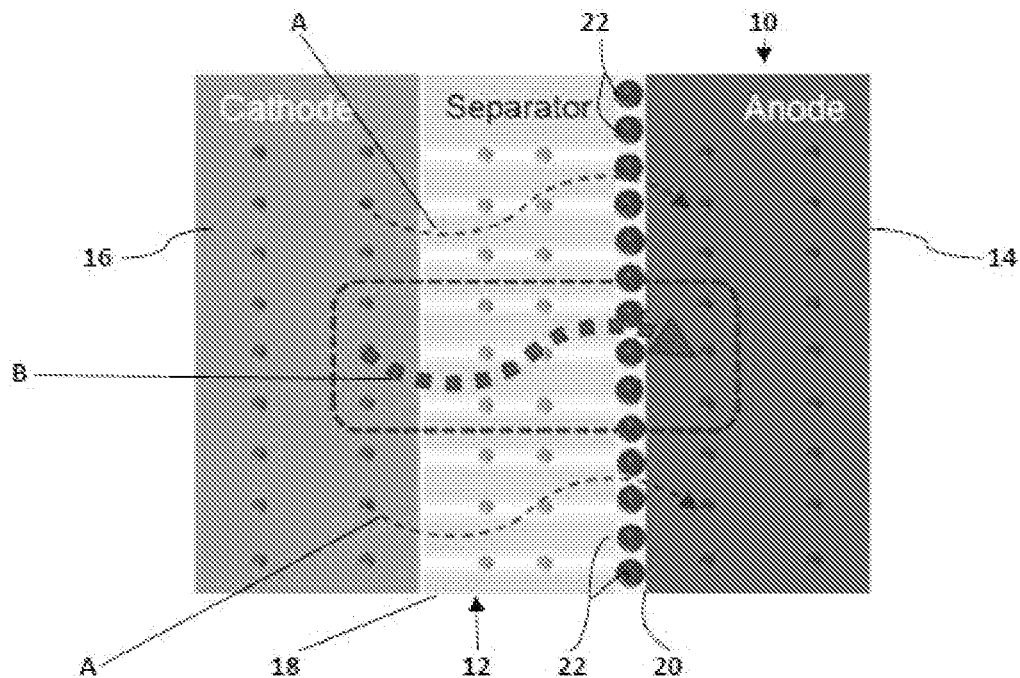
FIG. 1 is a schematic representation of an electrochemical cell in accordance with an embodiment of the present disclosure.

Any reference to the Periodic Table of Elements is that as published by CRC Press, Inc., 1990-1991. Reference to a group of elements in this table is by the new notation for numbering groups.

For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges disclosed herein include all values from, and including, the lower and upper value. For ranges containing explicit values (e.g., 1 or 2, or 3 to 5, or 6, or 7), any subrange between any two explicit values is included (e.g., the range 1-7 above includes subranges of from 1 to 2; from 2 to 6; from 5 to 7; from 3 to 7; from 5 to 6; etc.).

Unless stated to the contrary, implicit from the context, or customary in the art, all parts and percents are based on weight and all test methods are current as of the filing date of this disclosure.

The terms "blend" or "polymer blend," as used herein, is a blend of two or more polymers. Such a blend may or may not be miscible (not phase separated at molecular level). Such a blend may or may not be phase separated. Such a blend may or may not contain one or more domain configurations, as determined from transmission electron spectroscopy, light scattering, x-ray scattering, and other methods known in the art.

The term "composition" refers to a mixture of materials which comprise the composition, as well as reaction products and decomposition products formed from the materials of the composition.

The terms "comprising," "including," "having" and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

An "ethylene-based polymer" is a polymer that contains more than 50 weight percent (wt %) polymerized ethylene monomer (based on the total amount of polymerizable monomers) and, optionally, may contain at least one comonomer. Ethylene-based polymer includes ethylene homopolymer, and ethylene copolymer (meaning units derived from ethylene and one or more comonomers). The terms "ethylene-based polymer" and "polyethylene" may be used interchangeably. Nonlimiting examples of ethylene-based polymer (polyethylene) include low density polyethylene (LDPE) and linear polyethylene. Nonlimiting examples of linear polyethylene include linear low density polyethylene (LLDPE), ultra low density polyethylene (ULDPE), very low density polyethylene (VLDPE), multi-component ethylene-based copolymer (EPE), ethylene/α-olefin multi-block copolymers (also known as olefin block copolymer (OBC)), substantially linear, or linear, plastomers/elastomers, and high density polyethylene (HDPE). Generally, polyethylene may be produced in gas-phase, fluidized bed reactors, liquid phase slurry process reactors, or liquid phase solution process reactors, using a heterogeneous catalyst system, such as Ziegler-Natta catalyst, a homogeneous catalyst system, comprising Group 4 transition metals and ligand structures such as metallocene, non-metallocene metal-centered, heteroaryl, heterovalent aryloxyether, phosphinimine, and others. Combinations of heterogeneous and/or homogeneous catalysts also may be used in either single reactor or dual reactor configurations.

"Ethylene plastomers/elastomers" are substantially linear, or linear, ethylene/α-olefin copolymers containing homogeneous short-chain branching distribution comprising units derived from ethylene and units derived from at least one $C_3$-$C_{10}$ α-olefin comonomer. Ethylene plastomers/elastomers have a density from 0.870 g/cc to 0.917 g/cc. Nonlimiting examples of ethylene plastomers/elastomers include AFFINITY™ plastomers and elastomers (available from The Dow Chemical Company), EXACT™ Plastomers (available from ExxonMobil Chemical), Tafmer™ (available from Mitsui), Nexlene™ (available from SK Chemicals Co.), and Lucene™ (available LG Chem Ltd.).

"High density polyethylene" (or "HDPE") is an ethylene homopolymer or an ethylene/α-olefin copolymer with at least one $C_4$-$C_{10}$ α-olefin comonomer, or $C_4$-$C_8$ α-olefin comonomer and a density from 0.940 g/cc, or 0.945 g/cc, or 0.950 g/cc, 0.953 g/cc to 0.955 g/cc, or 0.960 g/cc, or 0.965 g/cc, or 0.970 g/cc, or 0.975 g/cc, or 0.980 g/cc. The HDPE can be a monomodal copolymer or a multimodal copolymer. A "monomodal ethylene copolymer" is an ethylene/$C_4$-$C_{10}$ α-olefin copolymer that has one distinct peak in a gel permeation chromatography (GPC) showing the molecular weight distribution. A "multimodal ethylene copolymer" is an ethylene/$C_4$-$C_{10}$α-olefin copolymer that has at least two distinct peaks in a GPC showing the molecular weight distribution. Multimodal includes copolymer having two peaks (bimodal) as well as copolymer having more than two peaks. Nonlimiting examples of HDPE include DOW™ High Density Polyethylene (HDPE) Resins (available from The Dow Chemical Company), ELITE™ Enhanced Polyethylene Resins (available from The Dow Chemical Company), CONTINUUM™ Bimodal Polyethylene Resins (available from The Dow Chemical Company), LUPOLEN™ (available from LyondellBasell), as well as HDPE products from Borealis, Ineos, and ExxonMobil.

"Low density polyethylene" (or "LDPE") consists of ethylene homopolymer, or ethylene/α-olefin copolymer comprising at least one $C_3$-$C_{10}$ α-olefin that has a density from 0.915 g/cc to less than 0.940 g/cc and contains long chain branching with broad MWD. LDPE is typically produced by way of high pressure free radical polymerization (tubular reactor or autoclave with free radical initiator). Nonlimiting examples of LDPE include MarFlex™ (Chevron Phillips), LUPOLEN™ (LyondellBasell), as well as LDPE products from Borealis, Ineos, ExxonMobil, and others.

"Linear low density polyethylene" (or "LLDPE") is a linear ethylene/α-olefin copolymer containing heterogeneous short-chain branching distribution comprising units derived from ethylene and units derived from at least one $C_3$-$C_{10}$ α-olefin comonomer. LLDPE is characterized by little, if any, long chain branching, in contrast to conventional LDPE. LLDPE has a density from 0.910 g/cc to less than 0.940 g/cc. Nonlimiting examples of LLDPE include TUFLIN™ linear low density polyethylene resins (available from The Dow Chemical Company), DOWLEX™ polyethylene resins (available from the Dow Chemical Company), and MARLEX™ polyethylene (available from Chevron Phillips).

An "olefin-based polymer" or "polyolefin" is a polymer that contains more than 50 weight percent polymerized olefin monomer (based on total amount of polymerizable monomers), and optionally, may contain at least one comonomer. Nonlimiting examples of olefin-based polymers include ethylene-based polymer and propylene-based polymer.

A "polymer" is a compound prepared by polymerizing monomers, whether of the same or a different type, that in polymerized form provide the multiple and/or repeating "units" or "mer units" that make up a polymer. The generic term polymer thus embraces the term homopolymer, usually employed to refer to polymers prepared from only one type of monomer, and the term copolymer, usually employed to refer to polymers prepared from at least two types of monomers. It also embraces all forms of copolymer, e.g., random, block, etc. The terms "ethylene/α-olefin polymer" and "propylene/α-olefin polymer" are indicative of copolymer as described above prepared from polymerizing ethylene or propylene respectively and one or more additional, polymerizable α-olefin monomer. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to has being based on "units" that are the polymerized form of a corresponding monomer.

A "propylene-based polymer" is a polymer that contains more than 50 weight percent polymerized propylene monomer (based on the total amount of polymerizable monomers) and, optionally, may contain at least one comonomer. Propylene-based polymer includes propylene homopolymer, and propylene copolymer (meaning units derived from propylene and one or more comonomers). The terms "propylene-based polymer" and "polypropylene" may be used interchangeably. Nonlimiting examples of suitable propylene copolymer include propylene impact copolymer and propylene random copolymer.

"Ultra low density polyethylene" (or "ULDPE") and "very low density polyethylene" (or "VLDPE") each is a linear ethylene/α-olefin copolymer containing heterogeneous short-chain branching distribution comprising units derived from ethylene and units derived from at least one $C_3$-$C_{10}$ α-olefin comonomer. ULDPE and VLDPE each has a density from 0.885 g/cc to 0.915 g/cc. Nonlimiting examples of ULDPE and VLDPE include ATTANE™ ultra low density polyethylene resins (available from The Dow Chemical Company) and FLEXOMER™ very low density polyethylene resins (available from The Dow Chemical Company).

Test Methods

Acid value (or acid number) is measured in accordance with ASTM D 1386/7. Acid value is a measure of the amount of carboxylic acid present in the final composition. The acid value is the number of milligrams of potassium hydroxide required for the neutralization of free carboxylic acids present in one gram of a substance (e.g., the dispersant). Units for acid value are mg KOH/g.

Average particle size refers to a volume mean particle size, as measured using a Malvern Zetasize NanoZS Light Scattering Particle Sizer, with results reported in micrometers (or microns).

Density is measured in accordance with ASTM D792, Method B. The result is recorded in grams per cubic centimeter (g/cc).

Differential Scanning Calorimetry (DSC)

Differential Scanning Calorimetry (DSC) can be used to measure the melting, crystallization, and glass transition behavior of a polymer over a wide range of temperature. For example, the TA Instruments Q1000 DSC, equipped with an RCS (refrigerated cooling system) and an autosampler is used to perform this analysis. During testing, a nitrogen purge gas flow of 50 ml/min is used. Each sample is melt pressed into a thin film at about 175° C.; the melted sample is then air-cooled to room temperature (about 25° C.). A 3-10 mg, 6 mm diameter specimen is extracted from the cooled polymer, weighed, placed in a light aluminum pan (ca 50 mg), and crimped shut. Analysis is then performed to determine its thermal properties.

The thermal behavior of the sample is determined by ramping the sample temperature up and down to create a heat flow versus temperature profile. First, the sample is rapidly heated to 180° C. and held isothermal for 3 minutes in order to remove its thermal history. Next, the sample is cooled to −40° C. at a 10° C./minute cooling rate and held isothermal at −40° C. for 3 minutes. The sample is then heated to 180° C. (this is the "second heat" ramp) at a 10° C./minute heating rate. The cooling and second heating curves are recorded. The cool curve is analyzed by setting baseline endpoints from the beginning of crystallization to −20° C. The heat curve is analyzed by setting baseline endpoints from −20° C. to the end of melt. The values determined are extrapolated onset of melting, Tm, and extrapolated onset of crystallization, Tc. Heat of fusion ($H_f$) (in Joules per gram), and the calculated % crystallinity for polyethylene samples using the following Equation: % Crystallinity=(($H_f$)/292 J/g)×100

The heat of fusion ($H_f$) (also known as melt enthalpy) and the peak melting temperature are reported from the second heat curve.

Melting point, Tm, is determined from the DSC heating curve by first drawing the baseline between the start and end of the melting transition. A tangent line is then drawn to the data on the low temperature side of the melting peak. Where this line intersects the baseline is the extrapolated onset of melting (TM). This is as described in Bernhard Wunderlich, *The Basis of Thermal Analysis, in Thermal Characterization of Polymeric Materials* 92, 277-278 (Edith A. Turi ed., 2d ed. 1997).

Glass transition temperature, Tg, is determined from the DSC heating curve where half the sample has gained the liquid heat capacity as described in Bernhard Wunderlich, *The Basis of Thermal Analysis, in Thermal Characterization of Polymeric Materials* 92, 278-279 (Edith A. Turi ed., 2d ed. 1997). Baselines are drawn from below and above the glass transition region and extrapolated through the Tg region. The temperature at which the sample heat capacity is half-way between these baselines is the Tg.

Drop point is measured in accordance with ASTM D3954.

Gas permeability. Gas permeability of the separator is measured using a tested using Genuine Gurley™ 4110 automatic densometer, in accordance with ASTM D-726-58. The coated separator sample was placed in an oven for 30 seconds at different temperatures ranging from room temperature to 120° C. The coated separator sample was removed from the oven and cooled to room temperature. Gas permeability was measured to determine whether the porous coating layer was melted. If the porous coating layer did not melt, the gas transmittance did not change. If the porous coating layer did melt, the gas transmittance changed. The coated separator sample was placed in the tube tester head with 1 square inch areas. 100 ml air was allowed to pass from one side of coated separator at 36.26 psi to other side at 7.25 psi. The time (in seconds) of all 100 ml gas transportation was recorded to evaluate separator permeability. A higher gas permeability value indicates a longer time for gas transmittance/penetration. A lower gas permeability value indicates a shorter time for gas transmittance/penetration, which indicates the pores on the coated separator are blocked.

Melt index (MI) (I2) in g/10 min is measured using ASTM D1238 (190° C./2.16 kg).

Melt flow rate (MFR) in g/10 min is measured using ASTM D1238 (230° C./2.16 kg).

Melt viscosity is measured using a Brookfield Viscometer Model, and a Brookfield RV-DV-II-Pro viscometer spindle 31, at 177° C. The sample is poured into the chamber, which is, in turn, inserted into a Brookfield Thermosel, and locked into place. The sample chamber has a notch on the bottom that fits the bottom of the Brookfield Thermosel, to ensure that the chamber is not allowed to turn, when the spindle is inserted and spinning. The sample (approximately 8-10 grams of resin) is heated to the required temperature until the melted sample is one inch below the top of the sample chamber. The viscometer apparatus is lowered, and the spindle submerged into the sample chamber. Lowering was continued, until the brackets on the viscometer align on the Thermosel. The viscometer is turned on, and set to operate at a shear rate, which leads to a torque reading in the range of 40 to 60 percent of the total torque capacity, based on the rpm output of the viscometer. Readings are taken every minute for 15 minutes, or until the values stabilize, at which point, a final reading is recorded.

Porosity is measured in accordance with ASTM D6583.

DETAILED DESCRIPTION

The present disclosure relates to an electrochemical cell. In an embodiment, the electrochemical cell includes a separator. The separator is disposed between an optional anode and an optional cathode. The separator includes (A) a porous substrate and (B) a porous coating layer on the porous substrate. The porous substrate (A) is composed of an olefin-based polymer having a melting point, Tm, greater than 130° C. The porous coating layer (B) has a melting temperature from 80° C. to 110° C. and the porous coating layer is composed of a plurality of microparticles and an optional binding agent. The microparticles have an average particle size from 0.3 microns to 1.5 microns. The microparticles are composed of (i) an ethylene-based polymer, (ii) a dispersant, and (iii) an optional acid functional wax. The ethylene-based polymer has (a) a density from 0.90 g/cc to less than 0.94 g/cc, (b) a Tm from 90° C. to 120° C., and (c) a melt index from 30 g/10 min to 600 g/10 min. The dispersant is composed of a $C_{14}$-$C_{40}$ aliphatic fatty acid.

A. Porous Substrate

The separator includes (A) a porous substrate (interchangeably referred to as a "blank separator"). The porous substrate is composed of an olefin-based polymer having a melting point, Tm, greater than 130° C., or from greater than 130° C. to 160° C. The olefin-based polymer has voids or pores that define a porosity that allow ionic species, such as lithium ions, for example, to diffuse, permeate, or otherwise transpire through the porous substrate. The pore size of the olefin-based polymer is from 1 to 100 microns, or from 1 micron to 50 microns, or from 1 micron to 25 microns, or from 1 micron to 10 microns. The olefin-based polymer has a porosity from 30%, or 40% to 50% or 60%. The porous substrate has a thickness from 0.1 mils, or 0.2 mils, 0.5 mils, or 1.0 mils, or 1.5 mils to 2.0 mils, or 2.5 mils, or 3.0 mils. The porous substrate permits ion transport therethrough. Nonlimiting examples of suitable olefin-based polymer include propylene-based polymer with a Tm greater than 130° C. and HDPE with a Tm greater than 130° C.

Non-limiting examples of commercially available microporous films suitable for use in the present invention include, for example, 1 mil thick CELGARD®) 2325 polyethylene film with about 41% void volume, 1 mil thick CELGARD® 2400 polypropylene film with about 35% void volume, 1 mil thick CELGARD® 2500 polypropylene film with about 45% void volume, each available from Celanese Corporation. Other commercially available porous materials that can be utilized in accordance with the present invention include HIPORE™ polyolefin flat film membrane available from Asahi Kasei Corporation, Tokyo, Japan including, for example, 1 mil thick HIPORE™ 720 microporous high density polyethylene with about a 37% void volume, 0.64 mil thick HIPORE™ 8416 microporous high density polyethylene with about a 41% void volume, 1 mil thick HIPORE™ 9420 microporous high density polyethylene with about a 41% void volume, and 1 mil thick HIPORE™ 6022 microporous high density polyethylene with about a 50% void volume.

B. Porous Coating Layer

The separator includes a porous coating layer (B). The porous coating layer directly contacts the porous substrate. The term "directly contacts," as used herein, refers to a layer configuration whereby a first layer is located immediately adjacent to a second layer and no intervening layers or no intervening structures are present between the first layer and the second layer. The porous substrate has opposing surface layers. The porous coating layer directly contacts one, or both, surface layers of the porous substrate. In an embodiment, the porous coating layer directly contacts, and is coextensive with, one (or both) surface layers of the porous substrate.

The porous coating layer is composed of the plurality of microparticles and the optional binding agent. The microparticles are composed of an ethylene-based polymer, (ii) a dispersant, and (iii) optionally an acid functional wax. The porous coating layer is coextensive, or substantially coextensive, with a surface layer of the porous separator. However, the microparticles have not coalesced to form a continuous film, and thereby impart porosity to the coating layer. Micropores exist in the porous coating layer due to the non-coalescence of the microparticles. The non-coalesced microparticles effectuate a porosity to the coating layer allowing ionic species, such as lithium ions, for example, to diffuse, permeate, or otherwise transpire through the porous coating layer.

When the porous coating layer is exposed to a temperature of 80° C., or greater than 80° C., or from 80° C. to 110° C., (as a result of thermal runaway in the electrochemical cell, for example), the ethylene-based polymer microparticles begin to soften and/or begin to melt, or otherwise coalesce. Upon softening and melt and microparticle coalescence, the microparticles form a continuous, or substantially continuous, and coextensive coating on the porous substrate. Thus, upon melt and/or microparticle coalescence, the porous coating layer transforms from a porous layer to a nonporous coating layer. In this way, the porous coating layer has a melting temperature from 80° C. to 110° C. It is understood that the DSC melting point, Tm, is different than the melting temperature of the porous coating layer. The porous coating layer has a thickness that provides a sufficient amount of microparticles/polymeric material to render effectively the porous coating layer substantially ionically impermeable, thereby preventing, or inhibiting, any further electrochemical reactions, upon melt and/or microparticle coalescence. In this way, the transformation of the porous coating layer into a nonporous and continuous coating layer aborts, or otherwise prevents, thermal runaway in the electrochemical cell.

In an embodiment, the porous coating layer has a thickness from 1 micron to 10 microns, or from 1 micron to 5 microns.

In an embodiment, the porous coating layer has a thickness from 1 mil to 10 mil, or from 1 mil to 5 mil.

i. Microparticles

The porous coating layer is composed of microparticles. The microparticles are composed of (i) an ethylene-based polymer, (ii) a dispersant, and (iii) optionally an acid functional wax. The ethylene-based polymer is an ethylene homopolymer or an ethylene/α-olefin copolymer having a density from 0.90 g/cc to less than 0.94 g/cc and a melt index (MI) from 30 g/10 min to 600 g/10 min. Nonlimiting examples of suitable ethylene-based polymer include LDPE; LLDPE; ULDPE; VLDPE; EPE; substantially linear, or linear, plastomers/elastomers; and combinations thereof.

In an embodiment, the microparticles are composed of an ethylene-based polymer that is an LDPE homopolymer. The LDPE homopolymer has one, some, or all of the following properties:
 (i) a density from 0.910 g/cc to 0.930 g/cc, or from 0.915 g/cc to 0.925 g/cc; and/or
 (ii) a MI from 40 g/10 min to 70 g/10 min, or from 50 g/10 min to 60; and/or
 (iii) a Tm from 105° C. to 115° C., or from 107° C. to 113° C.; and
 the microparticles composed of the LDPE homopolymer (and dispersant and optional acid functional wax) have one, some, or all of the following properties:
 (iv) a density from 0.910 g/cc to 0.930 g/cc, or from 0.915 g/cc to 0.925 g/cc; and/or (v) a MI from 40 g/10 min to 70 g/10 min, or from 50 g/10 min to 60; and/or
 (vi) a melting temperature from 80° C. to 110° C., or from 90° C. to 110° C.; and/or
 (vii) an average particle size from 0.3 to 1.5 microns, or from 0.5 microns to 1.4 microns.

In an embodiment, the ethylene-based polymer is an ethylene/α-olefin copolymer that is an ethylene/$C_3$-$C_8$ α-olefin comonomer. The ethylene/$C_3$-$C_8$ α-olefin comonomer is an ethylene/$C_3$-$C_8$ α-olefin copolymer composed of, or otherwise consisting of, ethylene and one copolymerizable $C_3$-$C_8$ α-olefin comonomer in polymerized form. The $C_3$-$C_8$ α-olefin is selected from propylene, butene, hexene, and octene.

In an embodiment, the ethylene/α-olefin copolymer is an ethylene/propylene copolymer.

In an embodiment, the ethylene/α-olefin copolymer is an ethylene/$C_4$-$C_8$ α-olefin copolymer. The ethylene/$C_4$-$C_8$ α-olefin comonomer is an ethylene/$C_4$-$C_8$ α-olefin copolymer composed of, or otherwise consisting of, ethylene and one copolymerizable $C_4$-$C_8$ α-olefin comonomer in polymerized form. The $C_4$-$C_8$ α-olefin comonomer is selected from butene, hexene, and octene. The ethylene/$C_4$-$C_8$ α-olefin comonomer is ethylene/butene copolymer, ethylene/hexene copolymer, or ethylene/octene copolymer.

In an embodiment, the microparticles are composed of an ethylene/α-olefin copolymer that is an ethylene/$C_4$-$C_8$ α-olefin copolymer.

In an embodiment, the microparticles are composed of an ethylene-based polymer that is an ethylene/Ct-C α-olefin copolymer (and dispersant and optional acid functional wax). The ethylene/$C_4$-$C_8$ α-olefin copolymer has one, some, or all of the following properties:
(i) a density from 0.900 g/cc to 0.935 g/cc, or from 0.900 g/cc to 0.910 g/cc, or from 0.925 g/cc to 0.935 g/cc; and/or
(ii) a MI from 30 g/10 min to 600 g/10 min, or from 30 g/10 min to 40 g/10 min, or from 400 g/10 min to 600 g/10 min; and/or
(iii) a Tm from 90° C. to 120° C., or from 93° C. to 98° C., or from 113° C. to 118° C.; and the microparticles composed of the ethylene/$C_4$-$C_8$ α-olefin copolymer have one, some, or all of the following properties:
(iv) a density from 0.900 g/cc to 0.935 g/cc, or from 0.900 g/cc to 0.910 g/cc, or from 0.925 g/cc to 0.935 g/cc; and/or
(v) a MI from 30 g/10 min to 600 g/10 min, or from 30 g/10 min to 40 g/10 min, or from 400 g/10 min to 600 g/10 min; and/or
(vi) a melting temperature from 80° C. to 110° C., or from 90° C. to 110° C.; and/or
(vii) an average particle size from 0.3 to 1.5 microns, or from 0.5 microns to 1.4 microns.

The microparticles also include (ii) a dispersant, and (iii) an optional acid-functionalized wax. The microparticles are formed by way of a stable aqueous formulation. The stable aqueous formulation is composed of the microparticles (ethylene-based polymer, dispersant, optional acid functional wax) and (iv) optional binding agent (including rheology modifier and wetting agent), and water is applied to the porous substrate. Once applied to the porous substrate, the stable aqueous formulation is dried to form the porous coating layer. A "stable aqueous formulation," as used herein, is an emulsion in which solid particles are uniformly suspended in a continuous aqueous phase. The solid particles of the formulation have a solids content. The "solids content" is the total combined weight of (i) the microparticles, and optional binding agent.

In an embodiment, the stable aqueous formulation that is applied to the porous substrate contains: (i) from 50 wt %, or 60 wt %, or 70 wt % to 90 wt %, or 95 wt % of the microparticles; (ii) from 1 wt %, or 2 wt %, or 5 wt % to 15 wt %, or 20 wt %, or 40 wt % of the dispersant; (iii) from 0 wt %, or 1 wt %, or 5 wt % to 15 wt %, or 20 wt % of the acid-functionalized wax; and (iv) from 0 wt %, or 0.05 wt % to 2 wt %, or 5 wt % binding agent, based on the total weight of the solids content.

The dispersant provides colloidal stability for the solids while in the stable aqueous formulation. The dispersant is a long chain fatty acid having from 14 to 40 carbon atoms or from 16 to 36 carbon atoms. Nonlimiting examples of long chain fatty acids suitable for the dispersant include Unicid™ 350 dispersing agent behenic ($C_{22}$) acid.

The microparticles optionally include an acid-functionalized wax. When the acid-functionalized wax is present in the microparticles, nonlimiting examples of suitable acid-functionalized wax include acid-functional modified polyolefin wax, maleic anhydride polyolefin copolymer, wax and maleic anhydride modified polyethylene wax. It is understood that the ethylene-based polymer from which the microparticles are made is not a wax and is not an acid-functionalized wax.

In an embodiment, the acid-functionalized wax is present in microparticles and the acid-functionalized wax is a maleic anhydride modified polyethylene wax.

The porous coating layer optionally includes a binding agent. The binding agent provides adhesion between the microparticles and the surface of the porous separator. When the binding agent is present in the porous coating layer (and the binding agent being present in the stable aqueous formulation), nonlimiting examples of suitable binding agents include styrene/butene rubber (SBR) latex, and acrylic emulsions, such as butyl acrylate emulsion, for example.

In an embodiment, the binding agent is present in the porous coating layer and the binding agent is a styrene/butene rubber. The binding agent also includes a wetting agent and a rheology modifier.

C. Electrochemical Cell

The electrochemical cell includes the separator disposed between an optional anode and an optional cathode. The separator is composed of the porous substrate (as disclosed above) and the porous coating layer on the porous substrate (as disclosed above).

FIG. 1 shows an electrochemical cell 10 with a separator 12, with an anode 14 present, and a cathode 16 present. Separator 12 is disposed between, or otherwise extends between, anode 14 and cathode 16. Separator 12 includes a porous substrate 18 and a porous coating layer 20. The porous substrate 18 can be any porous substrate as disclosed above, the porous substrate 18 composed of an olefin-based polymer, the olefin-based polymer having a Tm, greater than 130° C.

Separator 12 also includes porous coating layer 20. Porous coating layer 20 is coextensive with, and directly contacts, a surface of porous substrate 18, as shown in FIG. 1. Porous coating layer 20 is composed of (i) a plurality of microparticles (ethylene-based polymer, dispersant, optional acid-functional wax as previously disclosed herein), and (iv) optional binding agent (as previously disclosed herein), hereafter referred to as "porous coating material." The porous coating material takes the size and shape of the microparticles (and the shape of the binding agent when present). The microparticles and binding agent can be any microparticles and binding agent as previously disclosed herein. The microparticles are composed of an ethylene-based polymer, the ethylene-based polymer having (i) a density from 0.90 g/cc to less than 0.94 g/cc, (ii) a Tm from 90° C. to 120° C., (iii) a melt index from 30 g/10 min to 600 g/10 min, and (iv) the microparticles have an average particle size from 0.5 microns to 1.5 microns, as previously disclosed herein.

Porous coating material 22 forms a discontinuous and layer on porous substrate 18, effectuating the "porosity" of porous coating layer 20, as shown in FIG. 1. Electrochemical cell 10 includes an electrolyte thereby enabling ion flow, or otherwise enabling ion transport, from cathode 16, through separator 12, and to anode 14, as indicated by flow arrows A in FIG. 1.

Other nonlimiting components (not shown) for electrochemical cell 10 include a negative terminal, a positive terminal for charging/discharging electrochemical cell 10.

Arrow B in FIG. 1 shows the onset rapid temperature rise or "thermal runaway" in electrochemical cell 10. The rapid rise in temperature may be the result of an internal short circuit, an external short circuit, overcharging of the electrochemical cell, excessive current when charging or discharging the electrochemical cell, a material defect within the electrochemical cell, and any combination thereof. In the event of thermal runaway, the temperature can rise rapidly from ambient temperature to 80° C., or greater than 80° C., within milliseconds.

Figure 2:
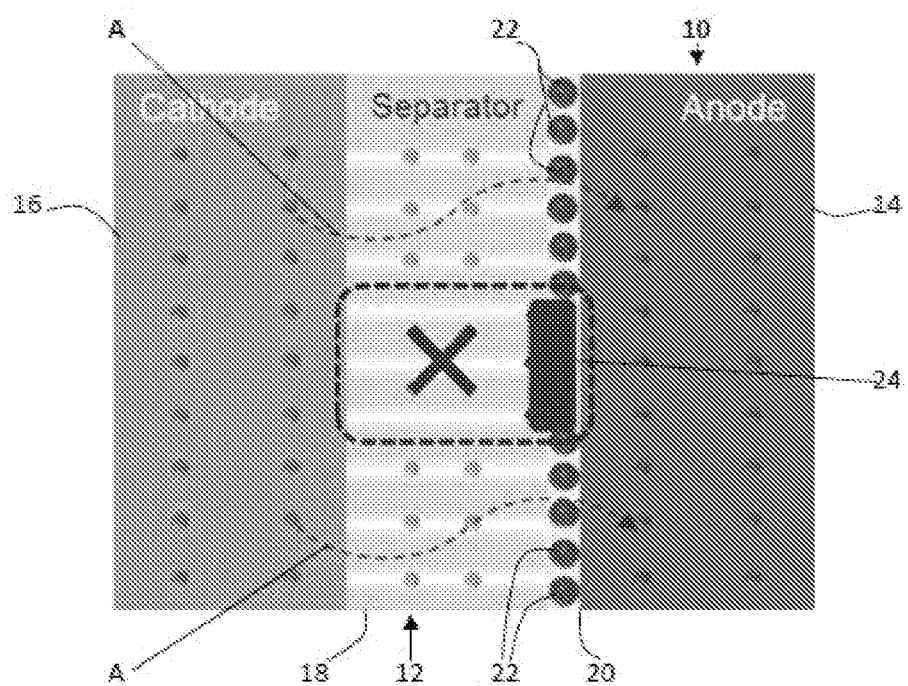
FIG. 2 is a schematic representation of an electrochemical cell in accordance with an embodiment of the present disclosure.

At the onset of thermal runaway, when the temperature rise reaches, or exceeds, 80° C., the porous coating material 22 coalesces, or otherwise melts, to form a continuous layer 24 of the coating material, along a portion of porous substrate 18 as shown in FIG. 2. Porous coating layer 22 coalesces and forms nonporous coating layer 24 on the porous substrate when separator 18 is exposed to a temperature greater than or equal to 80° C. Bounded by no particular theory, it is believed the ethylene-based polymer in the microparticles of the porous coating layer begin to soften and begin to melt at temperature from 80° C. to 110° C., or from 81° C. to 110° C., or from 90° C. to 110° C. or from 90° C. to 100° C.; in this temperature range, the softened and melting ethylene-based polymer microparticles coalesce to block flow through the porous substrate even though the ethylene-based polymer in the microparticles may not be completely melted. In other words, the ethylene-based polymer begins to soften and melt, and the microparticles coalesce before the temperature of the separator (and/or the temperature of the porous coating layer) reaches the Tm of the ethylene-based polymer.

Continuous layer 24 is non-porous. Continuous layer 24 also fills, or otherwise plugs, the pores within the porous substrate 18. Although FIG. 2 shows a portion of porous coating layer 20 coalescing (as non-porous and continuous layer 24), it is understood that the entire porous layer 20 could coalesce into a continuous, non-porous layer that is coextensive, or substantially coextensive, with the surface of porous substrate 18, in the event of severe thermal runaway.

Formation of continuous layer 24 (composed of porous coating material 22) blocks ion transport, thereby abruptly halting the thermal runaway as shown by indicia "X" in FIG. 2. In this way, the present separator 12 is a thermal shutdown safety device for the electrochemical cell 10.

In an embodiment, electrochemical cell 10 is a lithium-ion battery.

By way of example, and not limitation, some embodiments of the present disclosure will now be described in detail in the following Examples.

EXAMPLES

Materials used in the examples are provided in Table 1 below.

TABLE 1

| Material/Description | Properties | Source |
| --- | --- | --- |
| 959S | LDPE; ethylene homopolymer; density = 0.923 g/cc; MI: 55 g/10 min Tm: 110° C. | Dow Inc. |
| Engage 8402 | LLDPE; density = 0.902 g/cc; MI: 33 g/10 min Tm: 96° C. | Dow Inc. |
| ASPUN XUS 61850 | Ethylene/hexene copolymer; density = 0.93 g/cc, MI: 500 g/10 min Tm: 116° C. | Dow Inc. |
| A-C 575A | maleic anhydride modified polyethylene wax ethylene maleic anhydride copolymer; density = 0.92 g/cc drop point (ASTM D-3954) of 106° C. | Honeywell |
| UNICID 350 | dispersant long chain, linear primary carboxylic acid; melting point = 92° C.; acid number (mg KOH/g) = 120 | Baker Hughes |
| Behenic acid | dispersant Behenic acid, $C_{22}H_{44}O_2$ melting point = 80° C.; acid number (mg KOH/g) = 120 | Sinopharm Chemical Reagent Co., Ltd (SCRC) |
| Potassium hydroxide | KOH is a prototypical strong base, mole mass is 56.11 g/mol, density of 2.12 g/cc (25° C.) | SCRC |
| SBR latex | Binding agent Styrene-butadiene-rubber Made by an emulsion polymerization process using styrene, butadiene monomers. average particle size: 100 nm to 300 nm. Tensile strain (Displacement) at Maximum Load >200% Modulus (Automatic Young's) >10 MPa | Zeon Company |
| HW-1000 | Hydrocarbon based polyglycol nonionic surfactant High wetting performance on polyolefin surface HLB of ~10 Surface tension of ~26 | The Dow Chemical Company |
| DF-107 | Polyglycol nonionic surfactant Surface tension of 35 | The Dow Chemical Company |
| Acusol 823 | Hydrobolicaliy modified, Alkali Soluble acrylic rheology modifier | The Dow Chemical Company |

TABLE 1-continued

| Material/Description | Properties | Source |
|---|---|---|
| Porous substrate (or "blank separator") | HDPE separator with thickness of 20 um<br>Porosity of 40%<br>Puncturing Strength of 200 g | Tri-Element Material Company |

1. Dispersion Preparation Process

Aqueous dispersion samples were prepared using mechanical dispersion technology from Dow Inc. Ethylene-based polymer resin and dispersant were loaded into special designed twin-screw extruder (TSE) with back pressure around 2 MPa. Ethylene-based polymer resin, dispersant, and acid functional wax (when present) were melted and blended and subsequently injected with KOH solution and small volume initial water in TSE at temperature of 150° C. and 600 rpm screw rotation. A high internal phase emulsion (HIPE) was formed during this process and then diluted to 40~60% wt before back pressure valve. After emulsion cooling down below 100° C., the output was transferred to a container for collecting the dispersion of microparticles composed of the ethylene-based polymer resin. Process conditions and components are shown in Table 2 below.

2. Porous Coating Layer Preparation

The stable aqueous dispersion of microparticles was subsequently formulated with SBR binder, and other additives to form a liquid coating material. The liquid coating material was applied on HDPE porous substrate ("HDPE blank separator") using automated film applicator, TQC-020 (Sheen Company) equipped with HKC-1 rod bar. The coated HDPE porous substrate was transferred to an oven at 60° C. for five minutes drying time.

and dried to form a separator composed of (i) the porous substrate and (ii) the porous coating layer, the porous coating layer having a thickness of 1 mm.

Figure 3:
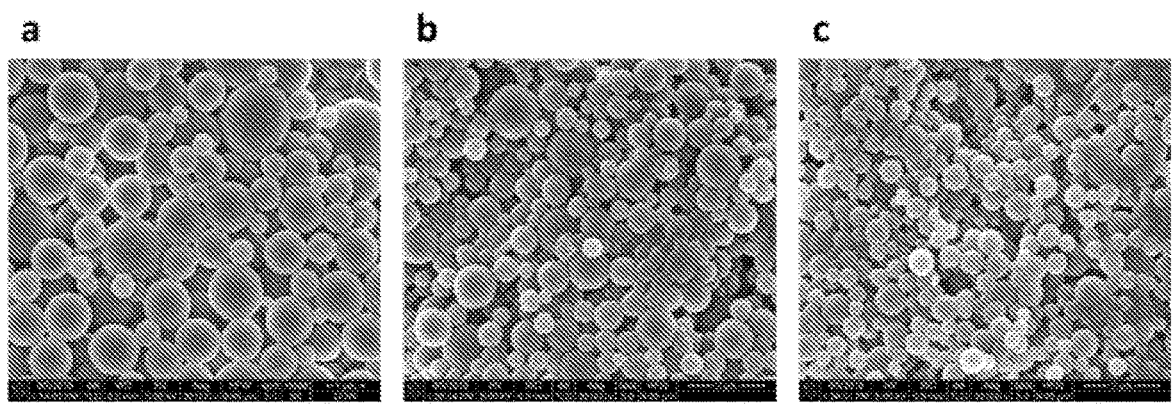
FIGS. 3(a), 3(b), and 3(c) show scanning electron micrographs (SEMs) of porous coating layers for respective inventive examples 1, 2, and 3.

Each separator (composed of (i) the porous substrate and (ii) the porous coating layer) was characterized by SEM. FIG. 3 shows surface SEM images of porous coating layer for: 3(a) IE1 959S-Unicid microparticles; 3(b) IE2 8420-behenic acid microparticles; and 3(c) IE3 8402-Unicid microparticles.

Table 2 (below) provides the average particle size for the microparticles in each of IE1-IE5. As shown by the SEMs in FIGS. 3(a), 3(b) and 3(c), each porous coating layer is composed of microparticles (of porous coating material) having a spherical shape, with IE1 959S-Unicid microparticles being larger than the microparticles of IE2 and IE3. The microparticle material for IE1-IE5 includes binding agent SBR latex to bind to HDPE separator and wetting agent for applying a uniform coating on the porous substrate, and rheology modifier to stabilize the formulation while in dispersion. In order to print a thin porous coating layer on the porous substrate, the liquid coating contains 16.6 wt % solids content based on total weight of liquid coating material. The solids content for the liquid coating material includes ethylene-based polymer, dispersant, binding agent, wetting agent, rheology modifier, and water.

TABLE 2 dispersion process conditions and microparticle size for IE1-IE5

| Particle dispersion | IE1 | IE2 | IE3 | IE4 | IE 5 |
|---|---|---|---|---|---|
| Polymer | LDPE 959S | Engage 8402 | Engage 8402 | XUS 61850 | LDPE 959S |
| Dispersant | Unicid 350 | Unicid 350 | Behenic Acid | Unicid | Unicid |
| Optional acid functional wax | n/a | n/a | n/a | n/a | AC-575 |
| Polymer feeding rate (g/min)/optional acid functional wax feeding rate (g/min) | 145/0 | 75/0 | 75/0 | 75/0 | 71.25/3.75 |
| Dispersant feeding rate (g/min) | 6 | 3.75 | 3.75 | 3.75 | 3.75 |
| 30% wt KOH feeding rate (ml/min) | 3.09 | 1.5 | 1.8 | 1.8 | 1.8 |
| Initial water feeding rate (ml/min) | 6.94 | 3.5 | 3 | 3 | 3 |
| Dilution water (g) | 160 | 70 | 70 | 70 | 70 |
| Extruder RPM | 600 | 600 | 600 | 600 | 600 |
| Wt % solids in dispersion* | 49.61% | 54.19% | 57.82% | 52.11% | 52.70% |
| Dispersion coating formulations (DCF) | 959S-Unicid (49.61% wt) | 8402-Unicid (54.19% wt) | 8402-Behenic acid (57.82%) | 61850-Unicid (52.11%) | 959S-AC wax-Unicid (52.70%) |
| Particle weight (g) | 30.24 | 27.68 | 25.94 | 28.78 | 28.46 |
| Water (g) | 66.36 | 68.92 | 70.66 | 67.82 | 68.14 |
| HW-1000 (g) | 0.2 | 0.2 | 0.2 | 0.2 | 0.2 |
| DF-107 (g) | 0.05 | 0.05 | 0.05 | 0.05 | 0.05 |
| Acusol 823 (g) | 0.15 | 0.15 | 0.15 | 0.15 | 0.15 |
| SBR (40% wt) (g) | 3 | 3 | 3 | 3 | 3 |
| Average particle size (nm) | 1282 | 765.5 | 682.3 | 614.4 | 754.4 |

*weight percent based on total weight of dispersion

Each dispersion coating formulation (DCF), IE1-IE5, was coated onto a respective individual and separate porous substrate (blank separator) using rod bar with 10~15 g/m$^2$ 3. Solvent Resistance Test For lithium-ion battery applications, the separator (composed of (i) the porous substrate and (ii) the porous coating layer) needs to be stable in the electrolyte, otherwise, battery performance will be diminished. Electrolyte solvent resistance was evaluated for IE1-IE5. DCF for each of IE1-IE5 was cast into a Petri Dish and dried at room temperature and then dried at temperature 90° C. to a form dried solid films of the porous coating layer (no porous substrate) having a thickness of 1 mm. Each film was cut into dumbbell shape and immersed in glass vial, which contained the mixture of electrolyte solvents of ethylene carbonate, propylene carbonate and ethyl methyl carbonate at the ratio of 1:1:1 by weight. The glass vial was heated to 50° C. for two days in oven and then the films of porous coating layer samples were taken out and wiped to get weight. The weight change results of IE1-IE5 films are listed in Table 3 below. Because the films of porous coating layer samples are made of ethylene-based polymer and SBR that are already proved to be stable in electrolyte, each IE1-IE5 sample absorbed electrolyte solvent less than 1% by weight. This result establishes that the material for the porous coating layer were resistant to electrolyte solvent.

TABLE 3 weight percent change after immersion of porous coating layer in electrolyte

| | Porous coating layer film | | | | |
|---|---|---|---|---|---|
| | IE1 959S-Unicid | IE2 8402-Unicid | IE3 8402-Behenic acid | IE4 61850-Unicid | IE5 959S-AC wax-Unicid |
| Weight change (after drying) | 0.79% | 0.27% | 0.30% | 0.28% | 0.64% |

4. Thermal Responsive Property

DCF for each of IE1-IE5 was coated onto a separate, individual HDPE separator blanks using a rod bar with 10~15 g/m². The coated separator blanks were placed in an oven to dry for five minutes at 60° C. to form separators IE1-IE5 composed of (i) the porous HDPE substrate and (ii) porous coating layer with microparticle material of IE1-IE5 (hereafter "separator IE1-IE5"). Each separator IE1-IE5 was heated at different temperatures to evaluate gas permeability performance and the pore-closing effect for the porous coating layer. The more time for gas transport from across the separator, the lower gas permeability of separator.

Figure 4:
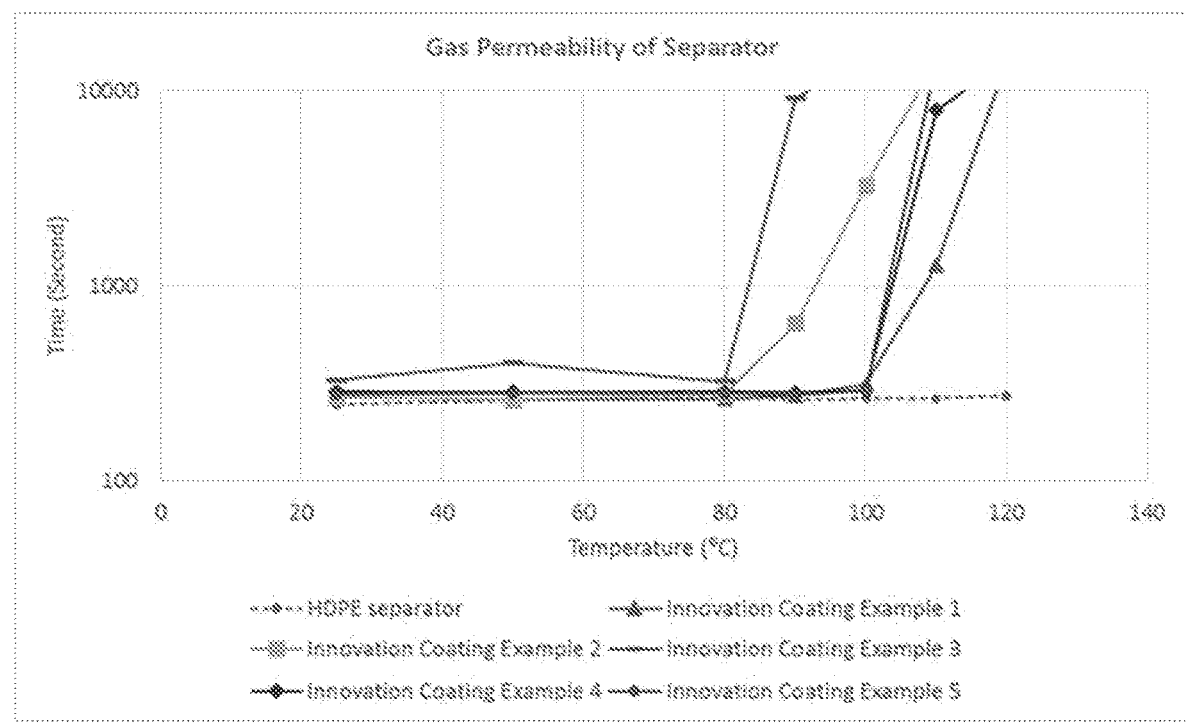
FIG. 4 is a temperature-time plot showing gas permeability of separators in accordance with embodiments of the present disclosure.

FIG. 4 shows the gas permeability of separators IE1-IE5, at different temperatures.

Gas permeability of coated separators IE1-IE5 was evaluated in the temperature range of room temperature to 120° C., in accordance with the gas permeability test disclosed above. The baseline HDPE separator blank exhibited a gas permeability that did not change significantly as the temperature increased from room temperature to 120° C. After testing the coated separator samples at different temperatures, the gas transmittance-temperature was plotted to identify the thermal responsive temperature.

The gas permeability for separator IE1 (microparticle material with 959S-Unicid), dropped sharply around 110° C., indicating IE1 melts and/or softens at 110° C.

Gas permeability for separator IE2 dropped sharply from 90° C. to 100° C., indicating that IE2 melts and/or softens at 90° C., or from 90° C. to 100° C.

Gas permeability for IE3 dropped sharply from 80° C. to 90° C., indicating that IE3 melts and/or softens at 80° C., or from 80° C. to 90° C.

Gas permeability for separators IE4-IE5 dropped sharply at temperature 100° C. to 110° C., indicating that IE4-IE5 melts and/or softens at 100° C., or from 100° C. to 110° C.

These gas permeability results demonstrate that IE1-5 porous coating layer material melts and seals the pores of the porous substrate at temperature from 80° C. to 110° C., or from 81° C. to 110° C. and in particular, at temperature from 90° C. to 110° C. or from 90° C. to 100° C. The gas permeability test demonstrates the pore-closing effect of porous coating layer composed of any of IE1-5 porous coating material. Bounded by no particular theory, it is believed the ethylene-based polymer in the microparticles of the porous coating layer begin to soften and begin to melt at temperature from 80° C. to 110° C., or from 81° C. to 110° C., or from 90° C. to 110° C.; in this temperature range, the softened and melting ethylene-based polymer microparticles coalesce to block flow through the porous substrate even though the ethylene-based polymer in the microparticles may not be completely melted. The gas permeability results demonstrate porous coating layer composed of any of IE1-5 will perform as an effective shutdown separator to prevent thermal runaway in an electrochemical cell.

It is specifically intended that the present disclosure not be limited to the embodiments and illustrations contained herein, but include modified forms of those embodiments including portions of the embodiments and combinations of elements of different embodiments as come within the scope of the following claims.

The invention claimed is:

1. An electrochemical cell comprising:
    a separator disposed between an optional anode and an optional cathode, the separator comprising
    (A) a porous substrate comprising an olefin-based polymer having a melting point, Tm, greater than 130° C.;
    (B) a porous coating layer on the substrate, the porous coating layer having a melting temperature from 80° C. to 110° C., the porous coating layer comprising a plurality of microparticles, and an optional binding agent, the microparticles having an average particle size from 0.3 microns to 1.5 microns, the microparticles comprising
    (i) an ethylene-based polymer, the ethylene-based polymer having
        (a) a density from 0.90 g/cc to less than 0.94 g/cc,
        (b) a Tm from 90° C. to 120° C.,
        (c) a melt index from 30 g/10 min to 600 g/10 min,
    (ii) a dispersant comprising a $C_{14}$-$C_{40}$ aliphatic fatty acid; and
    (iii) an optional acid functional wax.

2. The electrochemical cell of claim 1 wherein the porous substrate comprises a high density polyethylene.

3. The electrochemical cell of claim 1 wherein the ethylene-based polymer is a low density polyethylene having
    (a) a density from 0.910 g/cc to 0.930 g/cc,
    (b) a Tm from 105° C. to 115° C.,
    (c) a melt index from 40 g/10 min to 70 g/10 min, and
    the microparticles have an average particle size from 0.5 microns to 1.4 microns.

4. The electrochemical cell of claim 1 wherein the ethylene-based polymer is an ethylene/$C_4$-$C_8$ α-olefin copolymer having
    (a) a density from 0.900 g/cc to less than 0.935 g/cc,
    (b) a melt index from 30 g/10 min to 600 g/10 min,
    (c) a Tm from 90°° C. to 120° C., and
    the microparticles have an average particle size from 0.5 microns to 1.4 microns.

5. The electrochemical cell of claim 4 wherein the microparticles comprise the ethylene-based polymer, the dispersant, and the acid-functional wax.

6. The electrochemical cell of claim 5 wherein the acid-functional wax is a maleic anhydride modified polyethylene wax.

7. The electrochemical cell of claim 6 wherein the porous coating layer comprises the binding agent.

8. The electrochemical cell of claim 7 wherein the binding agent is a styrene/butene rubber.

9. The electrochemical cell of claim 8 wherein the porous coating layer has a thickness from 1 mil to 10 mils.

10. The electrochemical cell of claim 9 wherein at least one of the optional anode and the optional cathode is present in the electrochemical cell.

11. The electrochemical cell of claim 10 wherein the porous coating layer coalesces and forms a nonporous coating layer on the porous substrate when the separator is exposed to a temperature greater than or equal to 80° C.

* * * * *